United States Patent
Nozawa et al.

(10) Patent No.: US 12,452,967 B2
(45) Date of Patent: Oct. 21, 2025

(54) HEATING COOKING APPARATUS

(71) Applicant: SHARP KABUSHIKI KAISHA, Osaka (JP)

(72) Inventors: Rika Nozawa, Osaka (JP); Yu Kamata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 599 days.

(21) Appl. No.: 17/927,782

(22) PCT Filed: Jun. 18, 2021

(86) PCT No.: PCT/JP2021/023139
§ 371 (c)(1),
(2) Date: Nov. 25, 2022

(87) PCT Pub. No.: WO2021/261386
PCT Pub. Date: Dec. 30, 2021

(65) Prior Publication Data
US 2023/0269839 A1    Aug. 24, 2023

(30) Foreign Application Priority Data
Jun. 24, 2020  (JP) ................................. 2020-108940

(51) Int. Cl.
*H05B 6/64* (2006.01)
*H05B 6/68* (2006.01)

(52) U.S. Cl.
CPC ......... *H05B 6/6441* (2013.01); *H05B 6/6447* (2013.01); *H05B 2206/043* (2013.01)

(58) Field of Classification Search
USPC ....... 219/704, 702, 708, 710, 711, 712, 713, 219/716, 762
See application file for complete search history.

(56) References Cited

U.S. PATENT DOCUMENTS

| | | | | |
|---|---|---|---|---|
| 4,591,684 | A | * 5/1986 | Tanabe | H05B 6/6411 219/707 |
| 11,229,093 | B2 | * 1/2022 | Imai | H05B 6/6447 |
| 2006/0043190 | A1 | 3/2006 | Jeon | |
| 2019/0014625 | A1 | * 1/2019 | Matsui | H05B 6/687 |

FOREIGN PATENT DOCUMENTS

| | | |
|---|---|---|
| CN | 108451341 A | 8/2018 |
| CN | 109974043 A | 7/2019 |
| CN | 111195112 A | 5/2020 |
| JP | 3076649 U | 4/2001 |
| JP | 2006-064362 A | 3/2006 |

* cited by examiner

*Primary Examiner* — Quang T Van
(74) *Attorney, Agent, or Firm* — ScienBiziP, P.C.

(57) ABSTRACT

An object is to prevent a no-load operation. In a heating cooking apparatus (1) of the present invention, after a determination unit (22a) determines that no food product is present in a heating chamber (13), a reading control unit (22c) causes the reading device (16) to stop a reading operation for a predetermined time, or cancels, for a predetermined time, an information code read by the reading device (16).

5 Claims, 7 Drawing Sheets

HEATING COOKING APPARATUS

TECHNICAL FIELD

The present invention relates to a heating cooking apparatus for heating a food product placed in a heating chamber.

BACKGROUND ART

For example, convenience stores have provided the service of heating food products, such as boxed meals bought by customers, in a heating cooking apparatus, such as a microwave oven, and then handing the food products to the customers.

A suitable heating temperature and heating time in heating a food product depend on the type of food product. Therefore, in the heating cooking apparatuses described in PTL 1 and PTL 2, a barcode that is printed on a container of a food product and indicates the type of food product is read by a reading device, and the food product is heated in accordance with heating information (heating temperature and heating time) corresponding to the type of food product.

Specifically, in a configuration described in PTL 1, a barcode scanner is connected to a microwave oven, and a user manually operates the barcode scanner to read a barcode printed on a container of a food product, thereby obtaining the heating information corresponding to the type of food product.

In a configuration described in PTL 2, a barcode is read by scanning the barcode printed on a container of a food product over a first barcode reader provided on one side portion of the front face of a heating cooking apparatus, thereby obtaining the heating information corresponding to the type of food product. Alternatively, the food product contained in the container is placed inside a heating chamber of the heating cooking apparatus, and the barcode printed on the container of the food product is read by a second barcode reader provided on the top wall of the heating chamber, thereby obtaining the heating information corresponding to the type of food product.

CITATION LIST

Patent Literature

PTL 1: JP 2006-64362 A
PTL 2: JP 3076649 UM-B

SUMMARY OF INVENTION

Technical Problem

Note that neither PTL 1 nor PTL 2 describes timings when the barcode scanner or the first or second barcode reader reads the barcode. However, in a case where these reading devices are allowed to read barcodes all the time, there is a possibility that the barcode on the container of the food product will be erroneously read when the heated food product is taken out from the heating chamber. In this case, heating could be performed with no food product in the heating chamber since the food product has already been taken out from the heating chamber. That is, since a no-load operation is performed, a burden is imposed on a heating unit, for example, a magnetron, of the heating cooking apparatus, which may raise the problem of shortening the life of the apparatus.

An aspect of the present invention is to prevent a no-load operation.

Solution to Problem

To solve the above-described problem, a heating cooking apparatus according to an aspect of the present invention includes a heating chamber; a determination unit configured to determine whether a food product is present in the heating chamber; a reading device configured to read an information code for heating cooking of a food product; a heating control unit configured to perform heating control of the food product placed in the heating chamber based on the information code read by the reading device; and a reading control unit configured to control a reading operation of the reading device, wherein after the determination unit determines that no food product is present in the heating chamber, the reading control unit causes the reading device to stop the reading operation for a predetermined time, or after the determination unit determines that no food product is present in the heating chamber, the reading control unit cancels, for a predetermined time, the information code read by the reading device.

Advantageous Effects of Invention

An aspect of the present invention makes it possible to suppress a no-load operation.

DESCRIPTION OF EMBODIMENTS

First Embodiment

Figure 1:
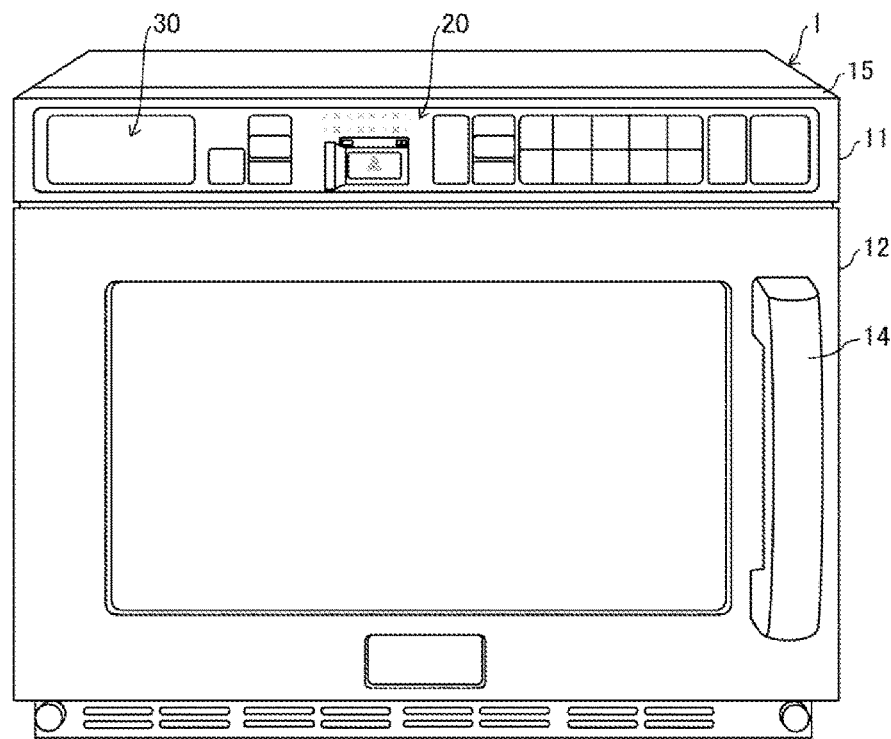
FIG. 1 is a perspective view of a heating cooking apparatus of an embodiment of the present invention with a front door thereof closed when viewed from an obliquely upper front side.
Figure 2:
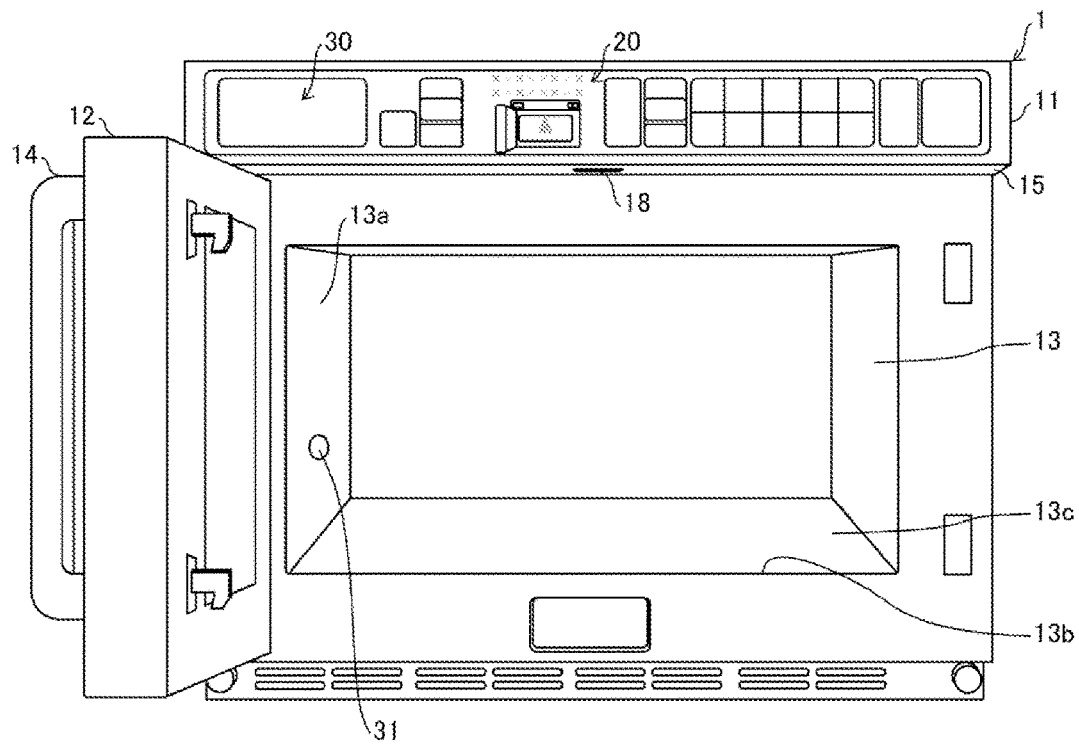
FIG. 2 is a front view of the heating cooking apparatus illustrated in FIG. 1 with the front door thereof opened.
Figure 3:
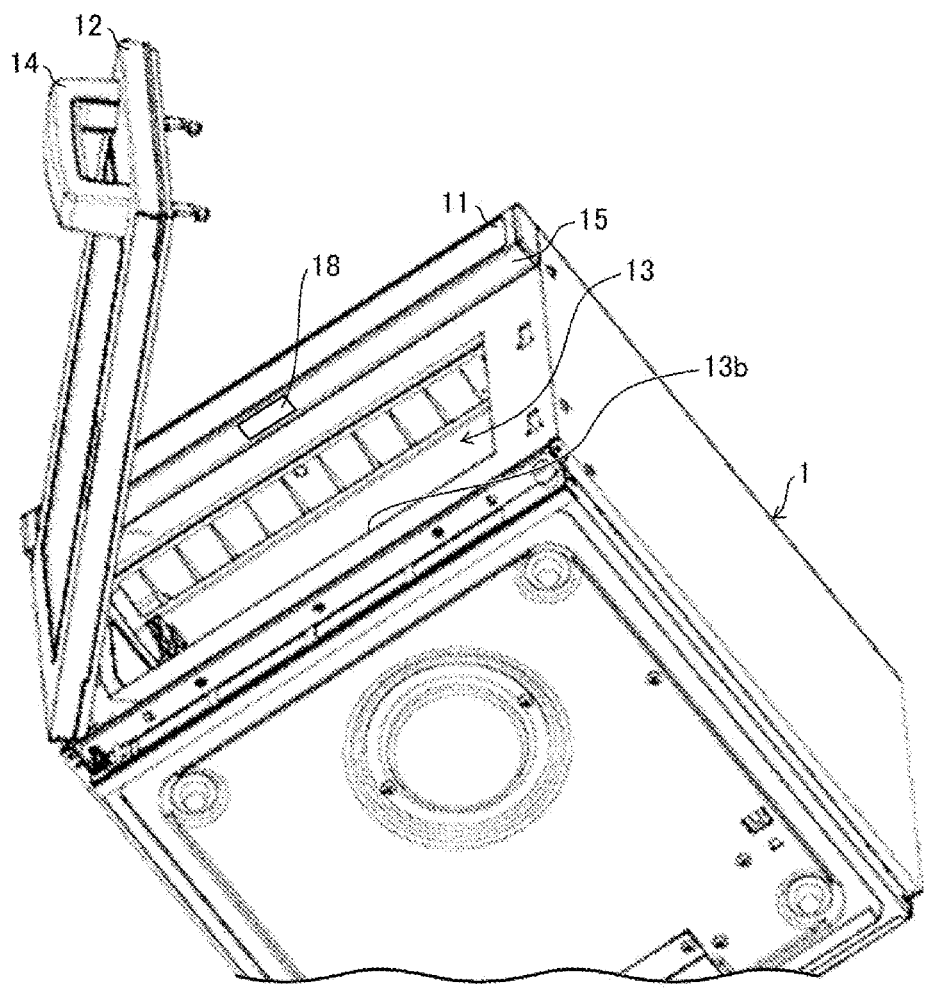
FIG. 3 is a perspective view of the heating cooking apparatus illustrated in FIG. 1 with the front door thereof opened when viewed from an obliquely lower right side.

An embodiment of the present invention will be described in detail below. FIG. 1 is a perspective view of a heating cooking apparatus 1 of the present embodiment, when viewed from an obliquely upper front side, in a state where a front door 12 that can be opened and closed and is provided on a main body of the heating cooking apparatus 1 is closed. FIG. 2 is a perspective view of the heating cooking apparatus 1 illustrated in FIG. 1 with the front door 12 thereof opened when viewed from an obliquely lower front side. FIG. 3 is a perspective view of the heating cooking apparatus 1 illustrated in FIG. 1 with the front door 12 thereof opened when viewed from an obliquely lower right side.

Outline of Heating Cooking Apparatus 1

As illustrated in FIG. 1 to FIG. 3, the heating cooking apparatus 1 is, for example, a microwave oven, and includes an operation panel 11 on an upper side of a front face and the front door 12 under the operation panel 11. The front door 12 is a door that opens and closes a heating chamber 13 provided behind the front door 12 and covers a front face opening 13b of the heating chamber 13 in a closed state. In the present embodiment, the front door 12 is a horizontal opening door that rotates about an end portion on the left side when viewed from the front and includes a handle 14 near a right end, which is an end portion on the opposite side to the rotation center.

In the heating chamber 13, as illustrated in FIG. 2, a food sensor 31 is provided on a side surface 13a inside the chamber. The food sensor 31 detects whether a food product is placed on a flat plate 13c provided on a bottom face inside the heating chamber 13. That is, the food sensor 31 detects presence or absence of a food product in the heating chamber 13. The details of the food sensor 31 and the food product detection will be described later.

The operation panel 11 is provided on a front face of a control frame 15. The operation panel 11 is provided such that the front face of the operation panel 11 is substantially flush with the front face of the front door 12 in a front-rear direction of the heating cooking apparatus 1.

A control board (not illustrated) that controls a display unit 30 of the operation panel 11, receives user operations with respect to, for example, input keys, and the like, is provided inside the control frame 15.

Reading Device 16

Figure 4:
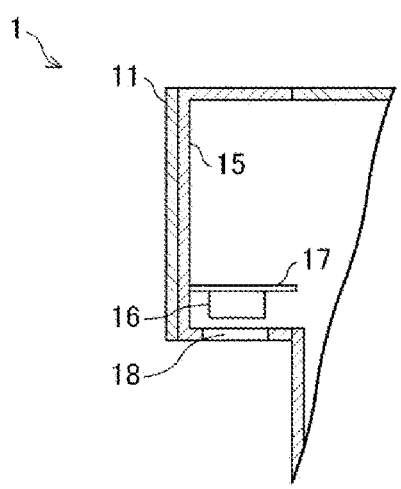
FIG. 4 is a vertical cross-sectional view of a control frame illustrating an installation state of a reading device included in the heating cooking apparatus illustrated in FIG. 1.
Figure 5:
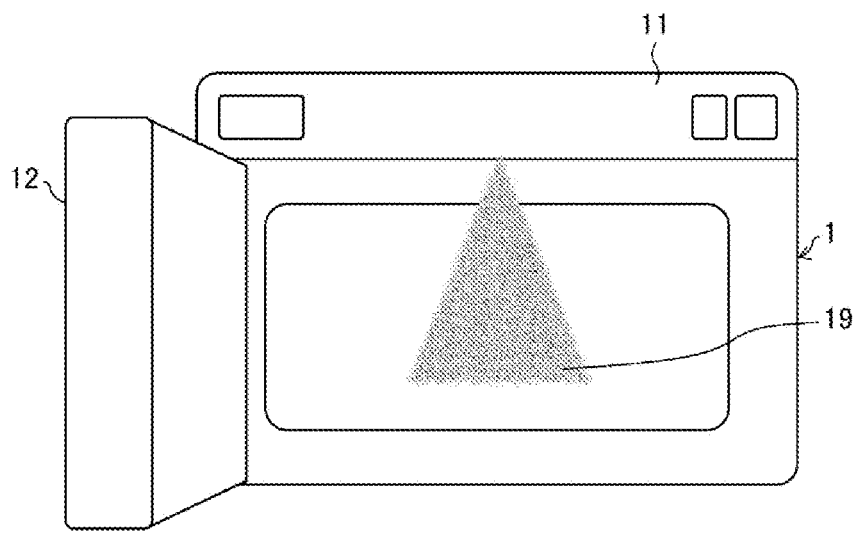
FIG. 5 is an explanatory diagram illustrating a reading region of the reading device illustrated in FIG. 4.

FIG. 4 is a vertical cross-sectional view of the control frame 15 illustrating the installation state of the reading device 16. FIG. 5 is an explanatory diagram illustrating a reading region 19 of the reading device 16.

As illustrated in FIG. 4, the control frame 15 is provided projecting toward the front side of the heating cooking apparatus 1. The reading device 16 is attached to a lower face of a reading device substrate (circuit board) 17 and is provided in a lower portion inside the control frame 15. The reading device substrate 17 is provided with a drive circuit of the reading device 16. In other words, the reading device 16 is installed on a position outside the heating chamber 13 and at an upper side of the front face opening 13b of the heating chamber 13 and is provided so as to have the reading region 19 on a lower side relative to the installed position.

The reading device 16 is, for example, a barcode reader, and is configured to read an information code (for example, a barcode) provided on a food product to be heated by the heating cooking apparatus 1 or a container of the food product.

As illustrated in FIG. 5, a region below the reading device 16 is the reading region 19 of the reading device 16, and the control frame 15 includes a transparent reading window 18 in a portion of a lower wall portion thereof facing the reading device 16.

The reading region 19 of the reading device 16 is indicated by, for example, red light so that a user can visually recognize the reading region 19. The red light is emitted by a reading region illumination unit 21 (see FIG. 8). A red LED, for example, is used as the reading region illumination unit 21. Note that light indicating the reading region 19 is not limited to red light but may be other light visible to the user, such as a laser. In addition, the number of red LEDs may be one or may be more than one.

In addition, as illustrated in FIG. 2 and FIG. 3, the reading device 16 is provided in a center portion in a width direction (right-left direction) of the front face opening 13b of the heating chamber 13.

Information Code

Figure 6:
FIG. 6 is an explanatory diagram illustrating specific examples of information codes.
Figure 6:
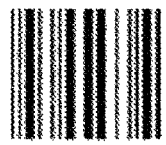

As indicated by a reference sign 1061 in FIG. 6 is an explanatory diagram illustrating an example of an information code constituted of a two-dimensional code (QR code (trademark)), and as indicated by a reference sign 1062 in FIG. 6 is an explanatory diagram illustrating an example of an information code constituted of a one-dimensional barcode.

Figure 8:
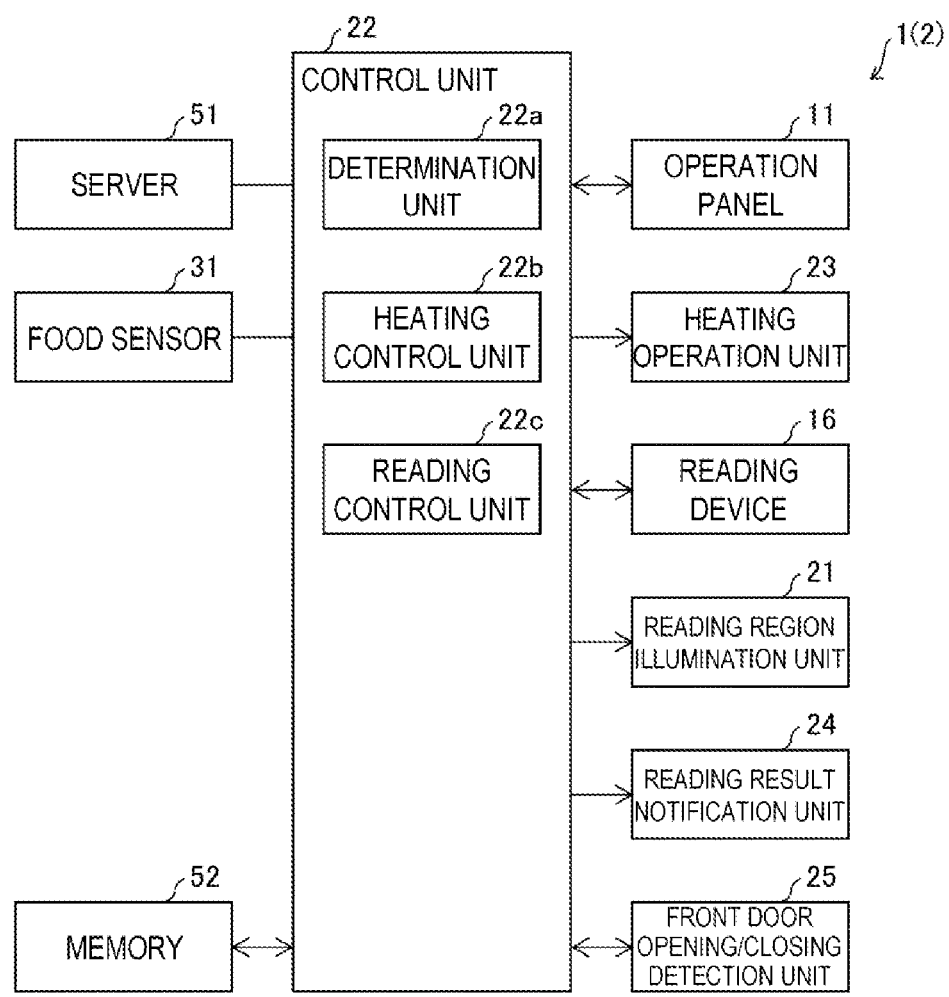
FIG. 8 is a block diagram illustrating a configuration of a control device included in the heating cooking apparatus illustrated in FIG. 1.

The information code is used for heating cooking of a food product. For example, the information code includes information indicating the type of food product and information indicating heating cooking conditions (heating information) for the food product of the type indicated. The heating information is information necessary for heating cooking and includes a heating time and wattage of a high-frequency output in the heating cooking apparatus 1. The information code specifically includes information indicating the type of food product, for example, indicating that the food product is a boxed meal (or additionally indicating the type of boxed meal), a rice ball (or additionally indicating the type of rice ball), or the like, and includes heating information including a heating time and wattage of a high-frequency output corresponding to the food product indicated by the above information. The information code is given to the food product or the container of the food product by, for example, being printed or applying a sticker thereon. Since the information code is used for heating cooking of the specified food product, the information code may include only information specifying the food product, and the heating information of the specified food product may be obtained from an external server 51 (FIG. 8). The information code may include only the heating information of the food product.

The information code may be, for example, a two-dimensional code as illustrated by a reference sign 1061 in FIG. 6 or may be a one-dimensional barcode as illustrated by a reference sign 1062 in FIG. 6. Note that the information code is not particularly limited to a barcode or the like as long as the information code can indicate the type of food product.

Detection of Presence or Absence of Food Product in Heating Chamber 13

Figure 7:
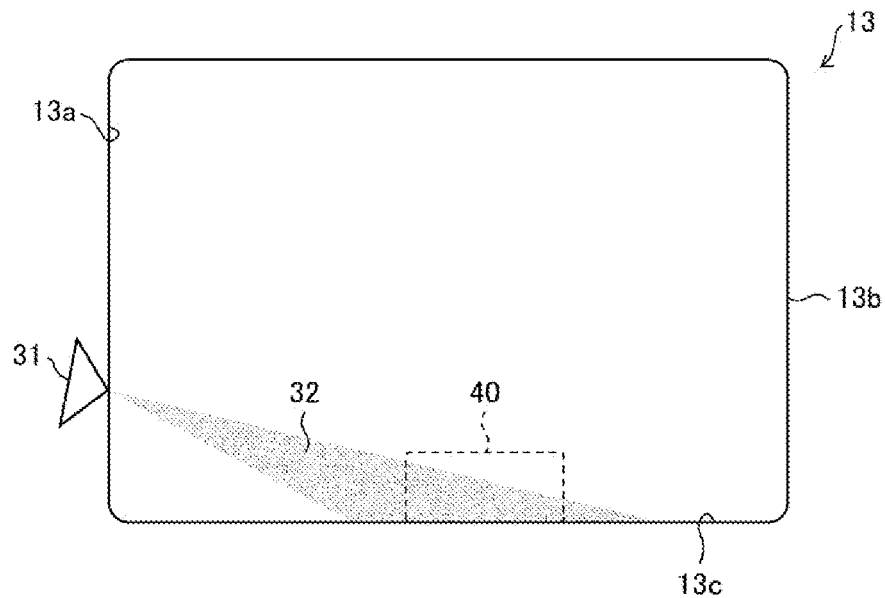
FIG. 7 is an explanatory diagram illustrating a placement example and a detection region of a food sensor in the heating cooking apparatus illustrated in FIG. 1.
Figure 7:
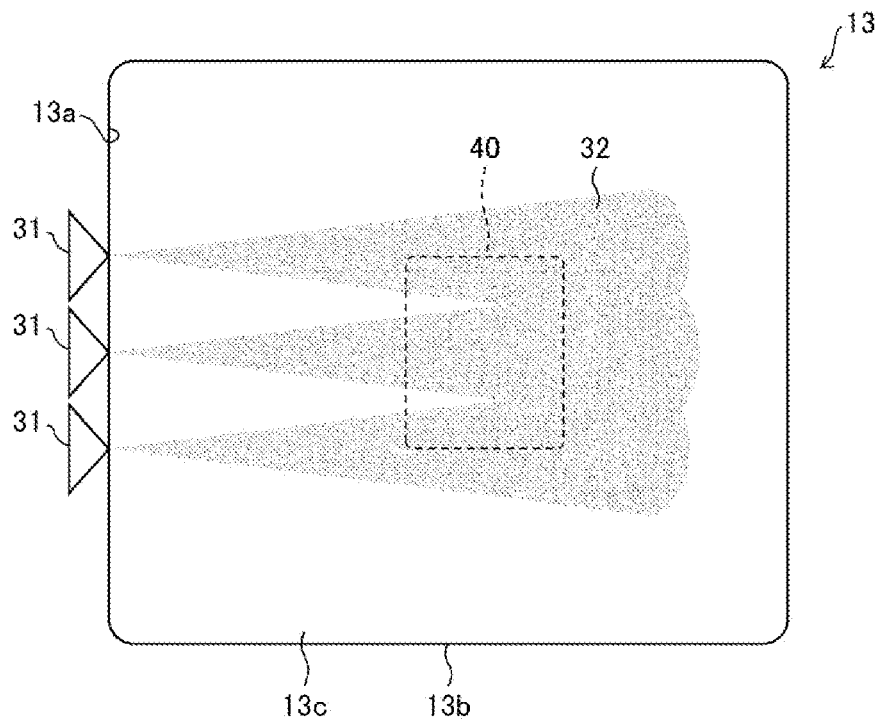

FIG. 7 is an explanatory diagram illustrating a placement example and a detection region of the food sensor 31 in the heating cooking apparatus 1 illustrated in FIG. 1.

The food sensor 31 is constituted of, for example, a reflective photosensor, and light from a light-emitting element in the reflective photosensor is radiated onto a detection-target object (food) and the light reflected by the detection-target object is received by the reflective photosensor, thereby detecting the presence or absence of the detection-target object. As indicated by a reference sign 1071 in FIG. 7, a radiation range of light from the light-emitting element of the food sensor 31 is a sensor detection area 32.

The food sensor 31 receives reflected light from the sensor detection area 32 and transmits a signal of light reception (light reception signal) to a control unit 22 (FIG. 8) of the heating cooking apparatus 1. The control unit 22 determines whether a food product 40 is present in the heating chamber 13 based on the transmitted light reception signal. The details of the determination of the presence or absence of the food product 40 will be described later.

As described above, in order to detect the presence or absence of the food product 40, which is a detection-target object placed in the heating chamber 13, it is necessary to adjust the position and size of the sensor detection area 32. As indicated by a reference sign 1072 in FIG. 7, the present embodiment describes an example in which three food sensors 31 are disposed in a depth direction of the heating chamber 13. Note that the heights of the three food sensors 31 from the installation surface are the same. In this manner, the sensor detection area 32 as a region for detecting the presence or absence of the food product 40 placed on the flat plate 13c of the heating chamber 13 is formed using the three food sensors 31 having the same height from the installation surface. Accordingly, by adjusting the number of food sensors 31 and the height from the installation surface in accordance with the size of the heating chamber 13, the sensor detection area 32 corresponding to the size of the heating chamber 13 may be formed. As discussed above, the number of food sensors 31, the installation height thereof, and the like are not particularly limited as long as the sensor detection area 32 with the desired size can be formed.

The food sensor 31 is not limited to a reflective photosensor; for example, three near-infrared LEDs and three photo transistors (with the received-light wavelength being 900 nm) may be used instead of the reflective photosensor. Accordingly, any configuration may be employed as the food sensor 31 as long as the presence or absence of the food product 40 in the heating chamber 13 can be detected.

Control Device

FIG. 8 is a block diagram illustrating a configuration of a control device included in the heating cooking apparatus 1. The control device includes the control unit 22 that controls operations of the heating cooking apparatus 1. The control unit 22 is constituted of, for example, a microcomputer, and includes a CPU, a ROM, and a RAM.

As illustrated in FIG. 8, the operation panel 11, a heating operation unit 23, the reading device 16, the reading region illumination unit 21, a reading result notification unit 24, a front door opening/closing detection unit (opening/closing detection unit) 25, and a memory (storage unit) 52 are connected to the control unit 22. The front door opening/closing detection unit 25 is constituted of, for example, a switch that is turned on when the front door 12 is closed, and detects an opened state and a closed state of the front door 12.

The heating operation unit 23 is an operation unit that heats a food product placed in the heating chamber 13 and is, for example, a microwave output device or a heater. The reading result notification unit 24 is a buzzer or a voice generator and is controlled by the control unit 22 to notify a user of success or failure in reading an information code by the reading device 16.

The control unit 22 can communicate with the server 51 by using, for example, an Internet line. Heating information corresponding to various types of food products is registered in the server 51. The control unit 22 acquires, from the server 51, heating information corresponding to the type of food product and acquired when the reading device 16 reads the information code, and controls the heating operation unit 23 to heat the food product in accordance with the acquired heating information. Note that the heating information corresponding to the type of food product may be included in the heating cooking apparatus 1 itself. In this case, the heating cooking apparatus 1 does not need to communicate with the server 51.

Further, the control unit 22 includes a determination unit 22a that determines whether the food product 40 is present in the heating chamber 13, a heating control unit 22b that controls the heating operation of the heating operation unit 23 based on a determination result of the determination unit 22a, and a reading control unit 22c that controls the reading operation of the reading device 16 based on the determination result of the determination unit 22a.

The determination unit 22a determines whether the food product 40 is present in the heating chamber 13 based on a signal (light reception signal) from the food sensor 31. Specifically, the presence or absence of the food product 40 is determined as follows. That is, in a case where the food product 40 is not placed within the sensor detection area 32, light emitted by the light-emitting element of the food sensor 31 is reflected by the flat plate 13c in the sensor detection area 32, and the reflected light is received by a light-receiving element. In contrast, in a case where the food product 40 is placed within the sensor detection area 32, the light emitted by the light-emitting element of the food sensor 31 is reflected by the food product 40 in front of the flat plate 13c in the sensor detection area 32, and the reflected light is received by the light-receiving element. In this case, the light reception intensity of the food sensor 31 when the food product 40 is not placed in the heating chamber 13 is taken as a reference value, and it is determined that the food product 40 is placed in the heating chamber 13 when the light reception intensity is different from the reference value.

The heating control unit 22b permits the heating operation of the heating operation unit 23 when the determination result of the determination unit 22a indicates that the food product 40 is present in the heating chamber 13, whereas the heating control unit 22b does not permit the heating operation of the heating operation unit 23 when the determination result of the determination unit 22a indicates that no food product 40 is present in the heating chamber 13.

Control Performed when Determination Unit 22a Determines No Food Product is Present In a case where the determination result of the determination unit 22a indicates that there is no food product 40 in the heating chamber 13, the reading control unit 22c causes the reading device 16 to stop the reading operation of the information code for a predetermined time or cancels the information code read by the reading device 16 for a predetermined time. The information code read by the reading device 16 includes heating information necessary for heating cooking. The heating information refers to a heating time and wattage of a high-frequency output in the heating cooking apparatus 1.

The predetermined time during which the operation of reading the information code by the reading device 16 is stopped and the predetermined time during which the information code read by the reading device 16 is canceled may be optionally set, and it is sufficient that they are each set to at least a period of time from when the food product 40 is completely taken out from the heating chamber 13 until when the food product 40 passes through the reading position of the reading device 16. By setting the predetermined time in this manner, when the food product having been heated is taken out from the heating chamber 13, the possibility that the information code will be read again by the reading device 16 can be further lowered.

The start of the predetermined time is preferably set to after a time point at which a transition occurs from a state where the determination unit 22a determines that the food product 40 is present in the heating chamber 13 to a state where the determination unit 22a determines that the food product 40 is not present in the heating chamber 13. In this case, the reading operation of the reading device 16 is stopped after the food product 40 is removed from the heating chamber 13; thus, even when the food product 40 taken out from the heating chamber 13 passes through the reading position of the reading device 16, the information code of the food product 40 is unlikely to be read.

Control Performed when Determination Unit 22a Determines Food Product is Present In a case where the determination result of the determination unit 22a indicates that the food product 40 is present in the heating chamber 13, the reading control unit 22c causes the reading device 16 to stop the reading operation or cancels the information code read by the reading device 16.

Thus, in a case where the food sensor 31 is out of order and determines that the food product 40 is present in the heating chamber 13 despite the absence of the food product 40 in the heating chamber 13, for example, the reading device 16 does not read the information code, or the information code is canceled even when read by the reading device 16, whereby a no-load operation can be suppressed.

The end of the predetermined time may be, for example, a time point when the closing of the front door 12 is detected by the front door opening/closing detection unit 25. Specifically, after the front door opening/closing detection unit 25 detects that the front door 12 is opened and the determination unit 22a determines that the food product 40 is not present in the heating chamber 13, and then, the predetermined time passes or the reading device 16 is caused to stop the reading operation and the front door opening/closing detection unit 25 detects that the front door 12 is closed, the stopping of the reading operation of the reading device 16 is terminated. In this case, the front door 12 needs to be opened in order to take out the food product 40 having been subjected to heating cooking from the heating chamber 13; thus, the food product 40 is taken out from the heating chamber 13 with the front door 12 opened. At this time, the stopping of the reading operation of the reading device 16 is initiated. Then, after the predetermined time passes, or after a time point at which the front door 12 is closed, the stopping of the reading operation of the reading device 16 is terminated. As a result, the information code of the food product 40 can be read by the reading device 16 when the front door 12 is opened and the food product 40 is put into the heating chamber 13 for the next heating cooking.

Heating information included in the information code having been read by the reading device 16 is stored in the memory 52. Therefore, heating information is registered in the memory 52 of the heating cooking apparatus 1 for a food product whose information code has been read once, and thus it is not necessary to acquire heating information every time an information code is read from the outside of the heating cooking apparatus 1.

Operation of Heating Cooking Apparatus 1

Operations of the heating cooking apparatus 1 in the above-described configuration will be described below. Here, a case where the food product 40 is assumed to be a boxed meal with an information code applied onto the upper face of a container thereof and is heated by the heating cooking apparatus 1 will be described.

First, a user confirms a guide display 20 (for example, "please open the door and scan the information code over the red light") of the operation panel 11. Then, the user opens the front door 12 in accordance with the guide display 20. When the front door opening/closing detection unit 25 detects the opened state of the front door 12, the control unit 22 causes the reading device 16 and the reading region illumination unit 21 to operate.

Next, the user moves a boxed meal such that the information code enters the reading region 19 of the reading device 16 (such that the information code is illuminated with the red light) in accordance with the guide display 20 of the operation panel 11.

This operation causes the reading device 16 to read the information code applied to the boxed meal. When the reading device 16 successfully reads the information code, the control unit 22 causes the reading result notification unit 24 to notify the user of the reading result. The operation of the reading result notification unit 24 in this case is, for example, an operation of emitting a continuous beep sound, an operation of outputting voice saying "the information code has been read successfully," or an operation including both the above operations.

When informed of the success of reading the information code by the reading result notification unit 24, the user places the boxed meal in the heating chamber 13, then closes the front door 12, and presses the start button on the operation panel 11. In this state, the boxed meal to be heated is placed at a predetermined position in the heating chamber 13. In other words, as indicated by a reference sign 1071 in FIG. 7, the boxed meal (food product 40) is placed in the sensor detection area 32 of the food sensor 31 in the heating chamber 13. At this time, in the control unit 22, the determination unit 22a determines that the boxed meal is placed in the heating chamber 13, and heating control by the heating control unit 22b, that is, a heating operation of the heating operation unit 23 is permitted based on the determination result.

When the information code is successfully read, the control unit 22 communicates with the server 51 to acquire heating information corresponding to the type of food product indicated by the information code from the server 51. Thereafter, when the user closes the front door 12 and presses the start button on the operation panel 11, the control unit 22 heats the boxed meal in the heating chamber 13 in accordance with the acquired heating information.

Thereafter, being associated with the control unit 22, the user closes the front door 12, operates heating change buttons 11a of the operation panel 11, and presses the start button. In response to the pressing of the start button, the boxed meal in the heating chamber 13 is heated in accordance with the acquired heating information.

On the other hand, when the reading of the information code by the reading device 16 fails, the control unit 22 causes the reading result notification unit 24 to notify the user of the reading result. The operation of the reading result notification unit 24 in this case is, for example, an operation of emitting an intermittent sound of "bleep, bleep, bleep," an operation of outputting a voice saying "the information code was not read correctly," or an operation including both the above operations.

When the user is informed of the failure of reading the information code by the reading result notification unit 24, the user moves the boxed meal again such that the information code enters the reading region 19 of the reading device 16 (such that the information code is illuminated with the red light). An operation to be performed when the information code is thus successfully read is as described earlier.

When the heating of the boxed meal is completed in the above-described manner, the user is notified of the completion of the heating, and the user takes the boxed meal out from the heating chamber 13. When the boxed meal is taken out from the heating chamber 13, the boxed meal is absent from the sensor detection area 32 in the heating chamber 13, and the signal of the light received by the food sensor 31 has the reference value, whereby the determination unit 22a of the control unit 22 determines that the boxed meal is not present in the heating chamber 13. The heating control unit 22b does not permit a heating operation of the heating operation unit 23 based on a determination result of the determination unit 22a (no boxed meal is placed in the heating chamber 13). Accordingly, no heating operation is performed by the heating operation unit 23 in a state where no boxed meal is placed in the heating chamber 13. That is, no heating operation is performed in a no-load state.

Furthermore, the reading control unit 22c causes the reading device 16 to stop the reading operation of the information code for a predetermined time based on the determination result of the determination unit 22a (the boxed meal is not placed in the heating chamber 13). Thus, for example, the reading device 16 does not read the information code of the boxed meal while the boxed meal is taken out, and therefore the heating control by the heating control unit 22b is not performed. When the determination unit 22a determines that the boxed meal is not placed in the heating chamber 13, the reading control unit 22c cancels the information code read by the reading device 16 for a predetermined time, and therefore the heating control by the heating control unit 22b is not performed in this case as well.

Reading Control of Information Code

Figure 9:
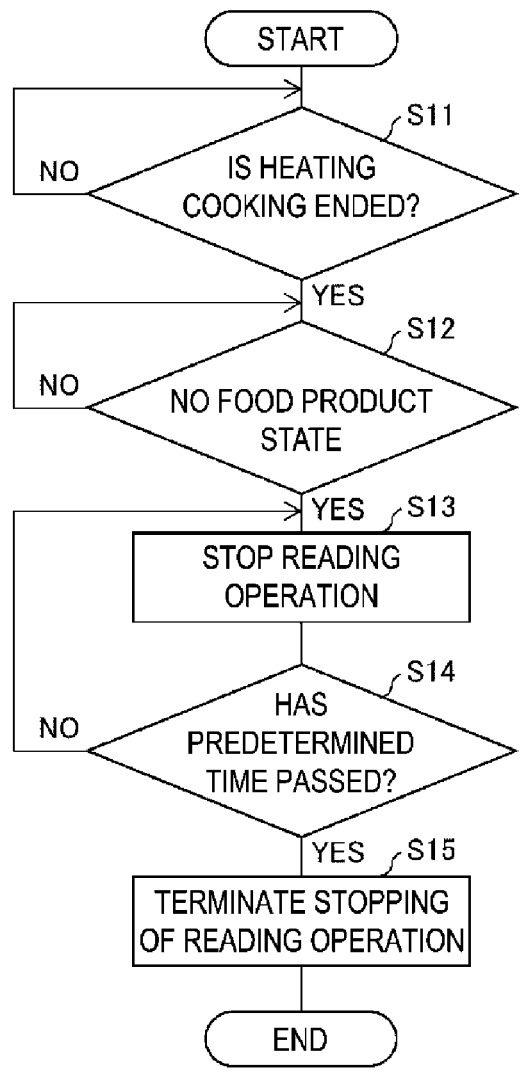
FIG. 9 is a flowchart illustrating a flow of reading control of an information code in the case of the heating cooking apparatus illustrated in FIG. 1.

FIG. 9 is a flowchart illustrating a flow of reading control of an information code in the heating cooking apparatus 1.

First, the control unit 22 determines whether the heating cooking has been ended (step S11). Specifically, the end of the heating cooking is determined by whether the control of the heating operation unit 23 by the heating control unit 22b of the control unit 22 has been completed.

Next, in a case where it is determined that the heating cooking has been ended in step S11 (YES), the control unit 22 determines whether the food product 40 is not present in the heating chamber 13 (step S12). Specifically, the determination unit 22a of the control unit 22 determines the presence or absence of the food product 40 based on the signal from the food sensor 31.

Subsequently, in a case where it is determined that no food product is present in step S12 (YES), the control unit 22 causes the reading device 16 to stop reading the information code (step S13). Specifically, the reading control unit 22c of the control unit 22 causes the reading device 16 to stop reading the information code.

Subsequently, the control unit 22 determines whether a predetermined time has passed (step S14). Specifically, the reading control unit 22c of the control unit 22 determines whether the predetermined time has passed. In other words, the reading control unit 22c determines whether the predetermined time has passed while the reading device 16 is caused to stop reading the information code. In a case where it is determined that the predetermined time has passed (YES), the reading control unit 22c terminates the stopping of the reading of the information code by the reading device 16 (step S15).

An example is described in which in the above process, the reading device 16 is caused to stop the reading of the information code for a predetermined time in the case of no food product, but the information code read by the reading device 16 may be canceled for a predetermined time in the case of no food product.

Effects

In the heating cooking apparatus 1 having the above-described configuration, whether the food product 40 is placed in the heating chamber 13 is determined, and when the determination result tells that the food product 40 is not placed in the heating chamber 13, the reading device 16 is caused to stop the reading operation for a predetermined time, or the information code read by the reading device 16 is canceled for a predetermined time. As a result, the reading of the information code by the reading device 16 is not performed for a predetermined time in a state where the heating-target object is not present in the heating chamber 13, that is, in a no-load state, or the information code is canceled for a predetermined time even when the information code is read, whereby the heating operation (no-load operation) by the heating operation unit 23 is also not performed. Accordingly, a problem that a burden is imposed on the magnetron due to the no-load operation and consequently the life of the apparatus is shortened does not arise.

In the present embodiment, in order to prevent a no-load operation in the heating cooking apparatus 1, when it is determined that the food product 40 is not present in the heating chamber 13, the reading of the information code by the reading device 16 is stopped for a predetermined time, or the information code is canceled for a predetermined time even when the information code is read. In a second embodiment described below, another example is described in order to prevent a no-load operation performed in the heating cooking apparatus 1.

Second Embodiment

Another embodiment of the present invention will be described below. Note that, for convenience of description, components having the same functions as those described in the above-described embodiment will be denoted by the same reference signs, and descriptions of those components will be omitted.

In the present embodiment, in addition to the control in the first embodiment, notification, to a user using the heating cooking apparatus 1, of information indicating the presence or absence of the food product 40 in the heating chamber 13 and information indicating whether the information code of the food product 40 has been read is performed, thereby making it possible to more reliably prevent a no-load operation.

Specifically, in the display unit (notification unit) 30 of the operation panel 11, the presence or absence of the food product 40 in the heating chamber 13 is displayed, whether the information code of the food product 40 has been read is displayed, and the like, whereby the user is visually notified of the status of the inside of the heating chamber 13 and the reading status of the information code.

Notification Example

Figure 10:
FIG. 10 is a diagram illustrating an example of notifications to a user in the case of a heating cooking apparatus of another embodiment of the present invention.
Figure 10:

FIG. 10 is a diagram illustrating an example of notifications to a user using the operation panel 11.

As indicated by a reference sign 1101 in FIG. 10, a notification area 30a having a substantially circular shape where the light is turned on and off is provided in a portion of a display screen of the display unit 30 in the operation panel 11, and notification of the presence or absence of the food product 40 in the heating chamber 13 may be performed using the notification area 30a. In the case where the food product 40 is present, the notification area 30a displays a light on state, whereas in the case where the food product 40 is not present, the notification area 30a displays a light off state. The display control of the notification area 30a is performed in accordance with the determination result from the determination unit 22a in the control unit 22. In other words, when the determination result indicates the presence of the food product, the notification area 30a displays the light on state, whereas when the determination result indicates the absence of the food product, the notification area 30a displays the light off state.

As indicated by a reference sign 1102 in FIG. 10, a first notification area 30b and a second notification area 30c each having a substantially rectangular shape where the light is turned on and off are provided in a portion of the display screen of the display unit 30 in the operation panel 11, and notification of the presence or absence of the food product 40 in the heating chamber 13 may be performed using the first notification area 30b and notification of whether the information code (QR code (trademark)) of the food product has been read may be performed using the second notification area 30c. The first notification area 30b displays a light on state in the case where the food product 40 is present, and displays a light off state in the case where the food product 40 is not present; the second notification area 30c displays a light on state in the case where the information code (QR code) has been read, and displays a light off state in the case where the information code (QR code) has not been read. The display control of the first notification area 30b is performed in accordance with the determination result from the determination unit 22a in the control unit 22. In other words, when the determination result indicates the presence of the food product, the notification area 30b is made to display the light on state, whereas when the determination result indicates the absence of the food product, the notification area 30b is made to display the light off state. On the other hand, the display control of the second notification area 30c is performed in the control unit 22 in accordance with the information indicating whether the information code has been read from the reading control unit 22c. In other words, when the information indicating whether the information code has been read indicates that the information code has been read, the second notification area 30c is made to display the light on state, whereas when the information indicating whether the information code has been read indicates that the information code has not been read, the second notification area 30c is made to display the light off state.

Effects

As described above, the presence or absence of the food product 40 in the heating chamber 13 and whether the information code has been read are displayed on the display unit 30 of the operation panel 11, whereby visual notification to the user is possible. That is, the user can understand the presence or absence of the food product 40 in the heating chamber 13 and whether the information code has been read by viewing the display unit 30. In this example, the information about which the user is to be notified (the presence or absence of the food product 40 and whether the information code has been read) is displayed in the display unit 30, but the notification scheme to the user is not particularly limited. For example, by using the reading result notification unit 24 constituted of a buzzer, a voice generator, or the like, and included in the heating cooking apparatus 1 of the first embodiment, the user may be notified of the presence or absence of the food product 40 in the heating chamber 13 and whether the reading device 16 has read the information code.

By notifying the user of the information indicating the presence or absence of the food product 40 in the heating chamber 13, it is possible to eliminate a situation in which the user directly checks the inside of the heating chamber 13 or is unable to understand whether the information code has been read. Furthermore, it is also possible to know whether the food sensor 31 is out of order. For example, in a case where the notification area 30a or 30b is lit despite the absence of the food product 40 in the heating chamber 13, it can be determined that the food sensor 31 is out of order.

Example of Implementation by Software

Control blocks (in particular, the determination unit 22a, the heating control unit 22b, and the reading control unit 22c) of the control unit 22 may be implemented by logic circuits (hardware) formed in integrated circuits (IC chips) and the like, or may be implemented by software.

In the latter case, the control unit 22 includes a computer that executes a command of a program that is software for implementing functions. The computer includes at least one processor (control device), for example, and includes at least one computer-readable recording medium having stored the program therein. In the computer, the processor reads the program from the recording medium and executes the program, thereby accomplishing the object of the present invention. For example, a central processing unit (CPU) may be used as the processor. As the recording medium, a "non-transitory tangible medium" such as a tape, a disk, a card, a semiconductor memory, and a programmable logic circuit may be used in addition to a read only memory (ROM) and the like. Additionally, a random access memory (RAM) on which the program is loaded, or the like may be further provided. Further, the program may be supplied to the computer via any transmission medium (a communication network, a broadcast wave, or the like) capable of transmitting the program. Note that an aspect of the present invention may be implemented in a form of a data signal embodied by electronic transmission of the program and embedded in a carrier wave.

Supplement

A heating cooking apparatus according to a first aspect of the present invention includes a heating chamber (13); a determination unit (22a) that determines whether a food product (40) is present in the heating chamber (13); a reading device (16) that reads an information code for heating cooking of the food product (40); a heating control unit (22b) that performs heating control of the food product (40) placed in the heating chamber (13) based on the information code read by the reading device (16); and a reading control unit (22c) that controls a reading operation of the reading device (16), in which after the determination unit (22a) determines that the food product (40) is not present in the heating chamber (13), the reading control unit (22c) causes the reading device (16) to stop the reading operation for a predetermined time, or after the determination unit (22a) determines that the food product (40) is not present in the heating chamber (13), the reading control unit (22c) cancels the information code read by the reading device (16) for a predetermined time.

According to the above configuration, after it is determined that there is no food product in the heating chamber, the reading operation of the reading device is stopped for a predetermined time, or the information code read by the reading device (16) is canceled for a predetermined time. As a result, even in a case where the food product is moved to a reading position of the reading device for a predetermined time, the information code of the food product is not read, or the information code of the food product is canceled even when the information code is read, and thus the heating control by the heating control unit based on the heating information included in the information code and required for heating cooking is not performed. Accordingly, the heating control with no food product placed in the heating chamber, that is, a no-load operation is not performed.

A heating cooking apparatus according to a second aspect of the present invention is such that, in the first aspect, the start of the predetermined time may be set after a time point at which a transition occurs from a state where the determination unit (22a) determines that the food product (40) is present in the heating chamber (13) to a state where the determination unit (22a) determines that the food product 40 is not present in the heating chamber (13).

According to the configuration described above, the start time of stopping the reading operation of the reading device is set after the time point at which the transition occurs from the state where it is determined that the food product is present in the heating chamber to a state where it is determined that the food product is not present in the heating chamber. Thus, because the reading operation of the reading device is stopped after the food product is removed from the heating chamber, even when the food product is moved to the reading position of the reading device, the information code of the food product is unlikely to be read, which makes it possible to lower the possibility that the heating control by the heating control unit is performed based on the heating information included in the information code and required for the heating cooking.

A heating cooking apparatus according to a third aspect of the present invention further includes, in the first or second aspect, a door (front door 12) that can be opened and closed with respect to a main body including the heating chamber (13), and an opening/closing detection unit (front door opening/closing detection unit 25) that detects opening/closing of the door (front door 12), in which after the opening/closing detection unit (front door opening/closing detection unit 25) detects that the door (front door 12) is opened and the determination unit (22a) determines that the food product (40) is not present in the heating chamber (13), and then, a predetermined time passes or the reading device (16) is caused to stop the reading operation and the opening/closing detection unit (front door opening/closing detection unit 25) detects that the door (front door 12) is closed, the reading control unit (22c) may terminate the stopping of the reading operation of the reading device (16) or may terminate the canceling of the information code read by the reading device (16).

According to the configuration described above, after the predetermined time passes, or after the time point at which the door is closed, the stopping of the reading operation of the reading device is terminated, or the canceling of the information code read by the reading device (16) is terminated. This makes it possible to read an information code of the food product by the reading device or use the information code having been read, when the door is opened and a food product is put in the heating chamber for next heating cooking.

A heating cooking apparatus according to a fourth aspect of the present invention may further include, in any one of the first to third aspects, a notification unit (display unit 30) that performs notification of a result brought by the determination unit (22a) and indicating presence or absence of the food product (40).

According to the configuration described above, the notification unit allows a user to recognize the presence or absence of the food product in the heating chamber.

A heating cooking apparatus according to a fifth aspect of the present invention is such that, in the fourth aspect, the notification unit (display unit 30) may further performs notification of a result indicating whether the reading device (16) has read the information code.

According to the configuration described above, the notification unit allows the user to recognize whether the information code has been read in addition to the presence or absence of the food product in the heating chamber.

The present invention is not limited to each of the above-described embodiments. It is possible to make various modifications within the scope of the claims. An embodiment obtained by appropriately combining technical elements disclosed in different embodiments falls also within the technical scope of the present invention. Further, technical elements disclosed in the respective embodiments may be combined to provide a new technical feature.

REFERENCE SIGNS LIST

1 Heating cooking apparatus
11 Operation panel
11a Heating change button
12 Front door (Door)
13 Heating chamber
13a Side surface
13b Front face opening
13c Flat plate
14 Handle
15 Control frame
16 Reading device
17 Reading device substrate
19 Reading region
20 Guide display
21 Reading region illumination unit
22 Control unit
22a Determination unit
22b Heating control unit
22c Reading control unit
23 Heating operation unit
24 Reading result notification unit
25 Front door opening/closing detection unit (Opening/closing detection unit)
30 Display unit (Notification unit)
30a Notification area
30b First notification area
30c Second notification area
31 Food sensor
32 Sensor detection area
40 Food product
51 Server
52 Memory

The invention claimed is:
1. A heating cooking apparatus, comprising:
a heating chamber;
a determination unit configured to determine whether a food product is present in the heating chamber;
a reading device configured to read an information code for heating cooking of a food product;

a heating control unit configured to perform heating control of the food product placed in the heating chamber, based on the information code read by the reading device; and a reading control unit configured to control a reading operation of the reading device, wherein after the determination unit determines that no food product is present in the heating chamber, the reading control unit causes the reading device to stop the reading operation for a predetermined time, or after the determination unit determines that no food product is present in the heating chamber, the reading control unit cancels, for a predetermined time, the information code read by the reading device.

2. The heating cooking apparatus according to claim 1, wherein a start of the predetermined time is set after a time point at which a transition occurs from a state where the determination unit determines that the food product is present in the heating chamber to a state where the determination unit determines that the food product is not present in the heating chamber.

3. The heating cooking apparatus according to claim 1, further comprising:

a door configured to be opened and closed with respect to a main body including the heating chamber; and an opening/closing detection unit configured to detect opening/closing of the door, wherein after the opening/closing detection unit detects that the door is opened and the determination unit determines that the food product is not present in the heating chamber, and then, a predetermined time passes or the reading device is caused to stop the reading operation and the opening/closing detection unit detects that the door is closed, the reading control unit terminates the stopping of the reading operation of the reading device or terminates the canceling of the information code read by the reading device.

4. The heating cooking apparatus according to claim 1, further comprising:

a notification unit configured to perform notification of a result brought by the determination unit and indicating presence or absence of the food product.

5. The heating cooking apparatus according to claim 4, wherein the notification unit further performs notification of a result indicating whether the reading device has read the information code.

* * * * *